(12) United States Patent
Mao et al.

(10) Patent No.: US 9,477,421 B1
(45) Date of Patent: Oct. 25, 2016

(54) SYSTEM AND METHOD FOR STORAGE MANAGEMENT USING ROOT AND DATA SLICES

(71) Applicant: EMC Corporation, Hopkinton, MA (US)

(72) Inventors: Qi Mao, Shanghai (CN); Kamakshi Viswanadha, Lexington, MA (US); Ye Zhang, Shanghai (CN); Jean-Pierre Bono, Westborough, MA (US); William C. Davenport, Burlington, MA (US); Changyong Yu, Shanghai (CN); Alex Zhongbing Yang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 118 days.

(21) Appl. No.: 13/928,976

(22) Filed: Jun. 27, 2013

(51) Int. Cl.
*G06F 12/00* (2006.01)
*G06F 13/00* (2006.01)
*G06F 13/28* (2006.01)
*G06F 3/06* (2006.01)

(52) U.S. Cl.
CPC ............. *G06F 3/0644* (2013.01); *G06F 3/067* (2013.01); *G06F 3/0607* (2013.01); *G06F 3/0604* (2013.01)

(58) Field of Classification Search
CPC .. G06F 12/121; G06F 3/0604; G06F 3/0607; G06F 3/0644; G06F 3/067
USPC ........... 711/159, 112, 173; 370/447; 718/104
See application file for complete search history.

(56) References Cited

U.S. PATENT DOCUMENTS

| | | | | |
|---|---|---|---|---|
| 7,631,155 | B1 * | 12/2009 | Bono et al. | 711/156 |
| 2004/0250014 | A1 * | 12/2004 | Sohn | 711/112 |
| 2011/0185135 | A1 * | 7/2011 | Fujii et al. | 711/162 |
| 2013/0275655 | A1 * | 10/2013 | Chang | G06F 12/0246 711/103 |

* cited by examiner

*Primary Examiner* — Yong Choe
*Assistant Examiner* — Shane Woolwine
(74) *Attorney, Agent, or Firm* — Brian J. Colandreo; Mark H. Whittenberger; Holland & Knight LLP

(57) ABSTRACT

A method, computer program product, and computing system for defining an initial root slice for a storage system. A first data slice is defined for the storage system. The location of the first data slice of the storage system is identified within the initial root slice. A request for a supplement data slice within the storage system is received. A determination is made as to if the supplement data slice can be added within the storage system without defining a supplemental root slice for a storage system.

21 Claims, 4 Drawing Sheets

SYSTEM AND METHOD FOR STORAGE MANAGEMENT USING ROOT AND DATA SLICES

TECHNICAL FIELD

This disclosure relates to storage systems and, more particularly, to systems and methods for managing storage systems.

BACKGROUND

Storing and safeguarding electronic content is of paramount importance in modern business. Accordingly, various systems may be employed to protect such electronic content.

Data storage systems may include frontend server devices and backend data arrays that work in concert to store such electronic content in a highly-available fashion. Further, the quantity of storage assigned to a specific user/task may be dynamically reconfigured/adjusted based upon actual need (as opposed to anticipated need).

SUMMARY OF DISCLOSURE

In one implementation, a computer-implemented method includes defining an initial root slice for a storage system. A first data slice is defined for the storage system. The location of the first data slice of the storage system is identified within the initial root slice. A request for a supplement data slice within the storage system is received. A determination is made as to if the supplement data slice can be added within the storage system without defining a supplemental root slice for a storage system.

One or more of the following features may be included. Identifying the location of the first data slice of the storage system within the initial root slice may include defining a device ID and a device offset for the first data slice within the initial root slice. If the supplement data slice cannot be added within the storage system without defining a supplemental root slice for a storage system, a supplemental root slice for a storage system may be defined. The supplemental data slice for the storage system may be defined. The location of the supplemental data slice of the storage system may be identified within the supplemental root slice. If the supplement data slice can be added within the storage system without defining a supplemental root slice for a storage system, the supplemental data slice for the storage system may be defined. The location of the supplemental data slice of the storage system may be identified within the initial root slice.

In another implementation, a computer program product resides on a computer readable medium and has a plurality of instructions stored on it. When executed by a processor, the instructions cause the processor to perform operations including defining an initial root slice for a storage system. A first data slice is defined for the storage system. The location of the first data slice of the storage system is identified within the initial root slice. A request for a supplement data slice within the storage system is received. A determination is made as to if the supplement data slice can be added within the storage system without defining a supplemental root slice for a storage system.

One or more of the following features may be included. Identifying the location of the first data slice of the storage system within the initial root slice may include defining a device ID and a device offset for the first data slice within the initial root slice. If the supplement data slice cannot be added within the storage system without defining a supplemental root slice for a storage system, a supplemental root slice for a storage system may be defined. The supplemental data slice for the storage system may be defined. The location of the supplemental data slice of the storage system may be identified within the supplemental root slice. If the supplement data slice can be added within the storage system without defining a supplemental root slice for a storage system, the supplemental data slice for the storage system may be defined. The location of the supplemental data slice of the storage system may be identified within the initial root slice.

In another implementation, a computing system including a processor and memory is configured to perform operations including defining an initial root slice for a storage system. A first data slice is defined for the storage system. The location of the first data slice of the storage system is identified within the initial root slice. A request for a supplement data slice within the storage system is received. A determination is made as to if the supplement data slice can be added within the storage system without defining a supplemental root slice for a storage system.

One or more of the following features may be included. Identifying the location of the first data slice of the storage system within the initial root slice may include defining a device ID and a device offset for the first data slice within the initial root slice. If the supplement data slice cannot be added within the storage system without defining a supplemental root slice for a storage system, a supplemental root slice for a storage system may be defined. The supplemental data slice for the storage system may be defined. The location of the supplemental data slice of the storage system may be identified within the supplemental root slice. If the supplement data slice can be added within the storage system without defining a supplemental root slice for a storage system, the supplemental data slice for the storage system may be defined. The location of the supplemental data slice of the storage system may be identified within the initial root slice.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
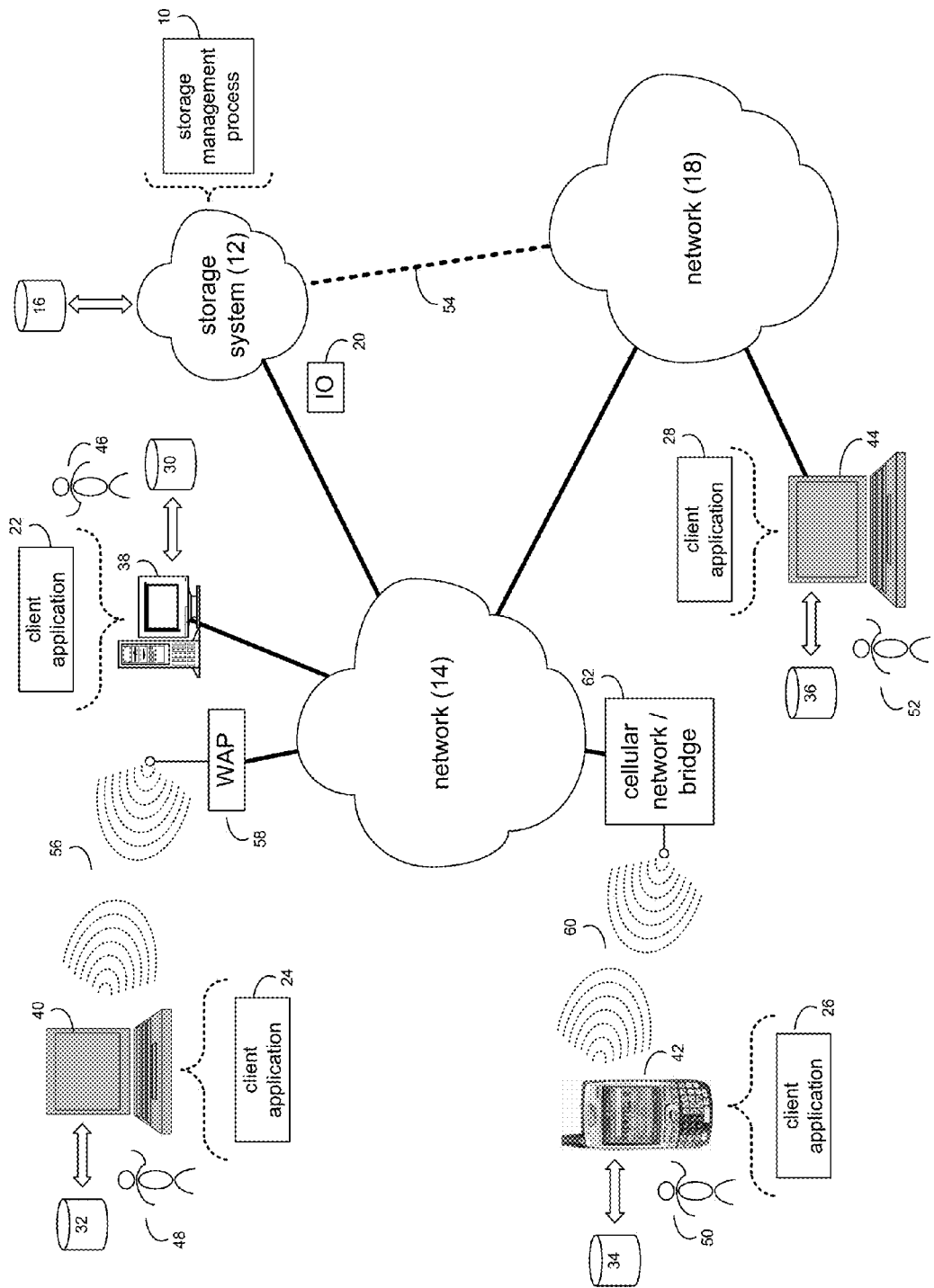
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows XP Server™; Novell Netware™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

Client electronic devices 38, 40, 42, 44 may each execute an operating system, examples of which may include but are not limited to Microsoft Windows™, Microsoft Windows CE™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure. For example and as discussed above, storage system 12 may be a personal computer that includes a single electro-mechanical storage device.

Figure 2:
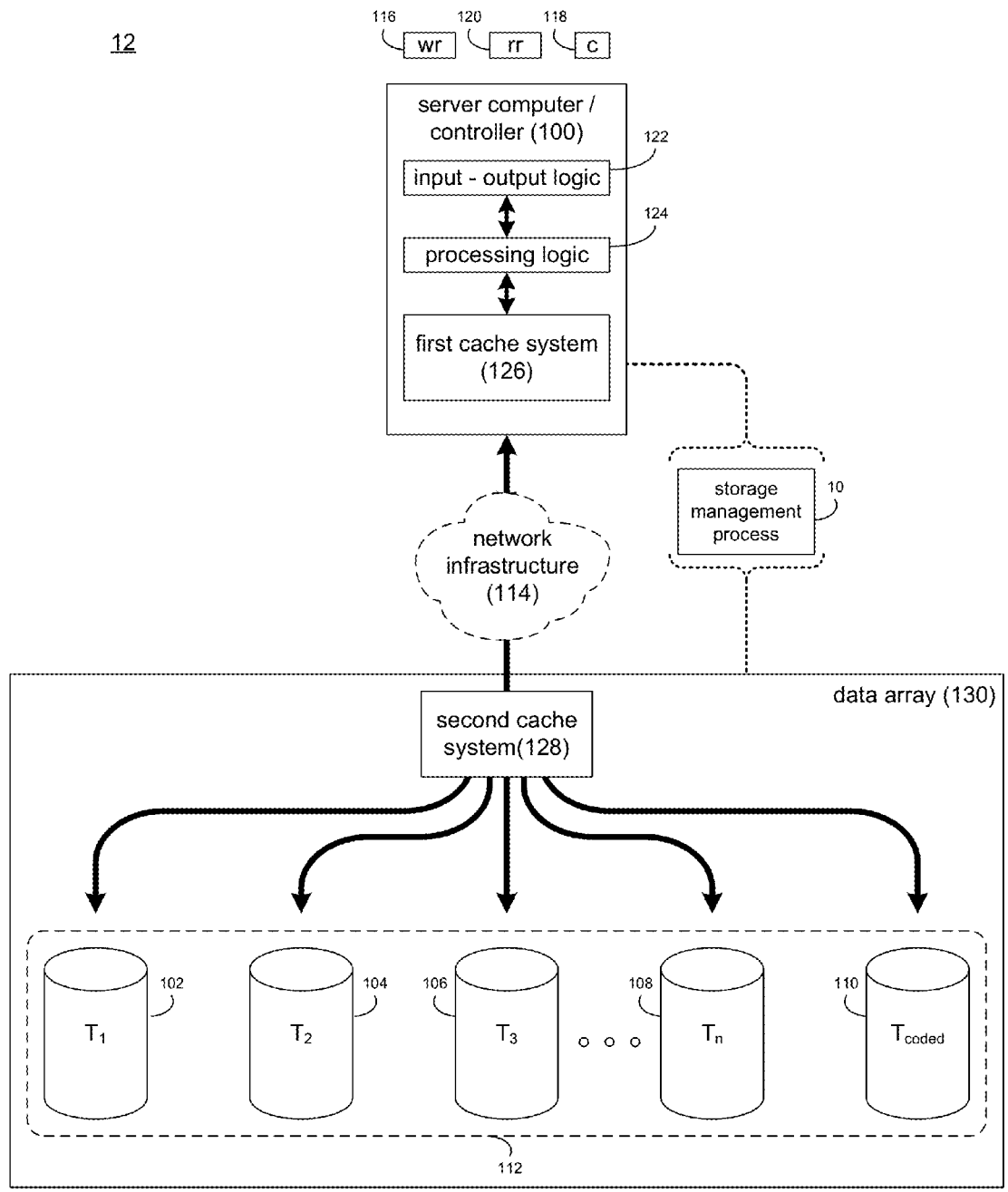
FIG. 2 is a diagrammatic view of the storage system of FIG. 1.

Referring also to FIG. 2, storage system 12 may include a server computer/controller (e.g. server computer/controller 100) and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives, wherein a combination of storage targets 102, 104, 106, 108 and coded target 110 may form non-volatile, electro-mechanical memory system 112.

The manner in which storage system 12 is implemented may vary depending upon e.g. the level of redundancy/performance/capacity required. For example, storage system 12 may be a RAID device in which server computer/controller 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which server computer/controller 100 may be e.g., a server computer and each of storage targets 102, 104, 106, 108 and/or coded target 110 may be a RAID device and/or computer-based hard disk drive. Further still, one or more of storage targets 102, 104, 106, 108 and/or coded target 110 may be a SAN.

In the event that storage system 12 is configured as a SAN, the various components of storage system 12 (e.g. server computer/controller 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to server computer/controller 100, may be executed by one or more processors (not shown) and one or more memory architectures (not shown) included within server computer/controller 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when server computer/controller 100 is configured as an application server, these IO requests may be internally generated within server computer/controller 100. Examples of IO request 20 may include but are not limited to data write request 116 (i.e. a request that content 118 be written to storage system 12) and data read request 120 (i.e. a request that content 118 be read from storage system 12).

Server computer/controller 100 may include input-output logic 122 (e.g., a network interface card or a Host Bus Adaptor (HBA)), processing logic 124, and first cache system 126. Examples of first cache system 126 may include but are not limited to a volatile, solid-state, cache memory system (e.g., a dynamic RAM cache memory system) and/or a non-volatile, solid-state, cache memory system (e.g., a flash-based, cache memory system).

During operation of server computer/controller 100, content 118 to be written to storage system 12 may be received by input-output logic 122 (e.g. from network 14 and/or network 18) and processed by processing logic 124. Additionally/alternatively and when server computer/controller 100 is configured as an application server, content 118 to be written to storage system 12 may be internally generated by server computer/controller 100. As will be discussed below in greater detail, processing logic 124 may initially store content 118 within first cache system 126.

Depending on the manner in which first cache system 126 is configured, processing logic 124 may immediately write content 118 to second cache system 128/non-volatile, electro-mechanical memory system 112 (if first cache system 126 is configured as a write-through cache) or may subsequently write content 118 to second cache system 128/non-volatile, electro-mechanical memory system 112 (if first cache system 126 is configured as a write-back cache). Additionally and in certain configurations, processing logic 124 may calculate and store coded data on coded target 110 (included within non-volatile, electromechanical memory system 112) that may allow for the regeneration of data lost/corrupted on one or more of storage targets 102, 104, 106, 108. For example, if processing logic 124 was included within a RAID controller card or an NAS/SAN controller, processing logic 124 may calculate and store coded data on coded target 110. However, if processing logic 124 was included within e.g., an applications server, data array 130 may calculate and store coded data on coded target 110.

Examples of second cache system 128 may include but are not limited to a volatile, solid-state, cache memory system (e.g., a dynamic RAM cache memory system) and/or a non-volatile, solid-state, cache memory system (e.g., a flash-based, cache memory system).

The combination of second cache system 128 and non-volatile, electromechanical memory system 112 may form data array 130, wherein first cache system 126 may be sized so that the number of times that data array 130 is accessed may be reduced. Accordingly, by sizing first cache system 126 so that first cache system 126 retains a quantity of data sufficient to satisfy a significant quantity of IO requests (e.g., IO request 20), the overall performance of storage system 12 may be enhanced.

Further, second cache system 128 within data array 130 may be sized so that the number of times that non-volatile, electromechanical memory system 112 is accessed may be reduced. Accordingly, by sizing second cache system 128 so that second cache system 128 retains a quantity of data sufficient to satisfy a significant quantity of IO requests (e.g., IO request 20), the overall performance of storage system 12 may be enhanced.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on server computer/controller 100, some or all of the instruction sets and subroutines of storage management process 10 may be executed by one or more processors (not shown) and one or more memory architectures (not shown) included within data array 130.

The Storage Management Process:

Storage system 12 may be configured to provide storage on an as needed basis. For example, storage system 12 may be thinly provisioned. Specifically, while a defined maximum quantity of storage may be defined for a particular user/task, the actual storage space blocked off for the particular user/task may only be provided as it is actually needed. For example, assume for illustrative purposes that 32.0 gigabytes of storage space (from storage system 12) is assigned to a particular user (e.g., user 46). However and when thinly provisioned, instead of initially blocking out 32.0 gigabytes of storage space for user 46, 0.0 gigabytes of storage space may be initially assigned to user 46; and as user 46 writes data to storage system 12, storage space within storage system 12 may be assigned to user 46 to accommodate the data being written by user 46 to storage system 12.

Accordingly, if user 46 writes 16.0 gigabytes of data to storage system 12, 16.0 gigabytes of storage space within storage system 12 may be allocated to user 46 to accommodate the 16.0 gigabytes of data being written. If user 46 subsequently deletes 8.0 gigabytes of the 16.0 gigabytes of data that was previously written to storage system 12, that 8.0 gigabytes of storage space may be freed up and available to other users/tasks (as opposed to being blocked off for user 46). Accordingly, the quantity of storage space blocked of for the exclusive use of a user may be dynamically adjusted in accordance with their actual storage usage (as opposed to blocking off and reserving the maximum quantity of storage space for the user). Naturally, in the event that e.g., user 46 tries to write more than 32.0 gigabytes of data to storage system 12, user 46 may receive an over capacity error from storage system 12.

Figure 3:
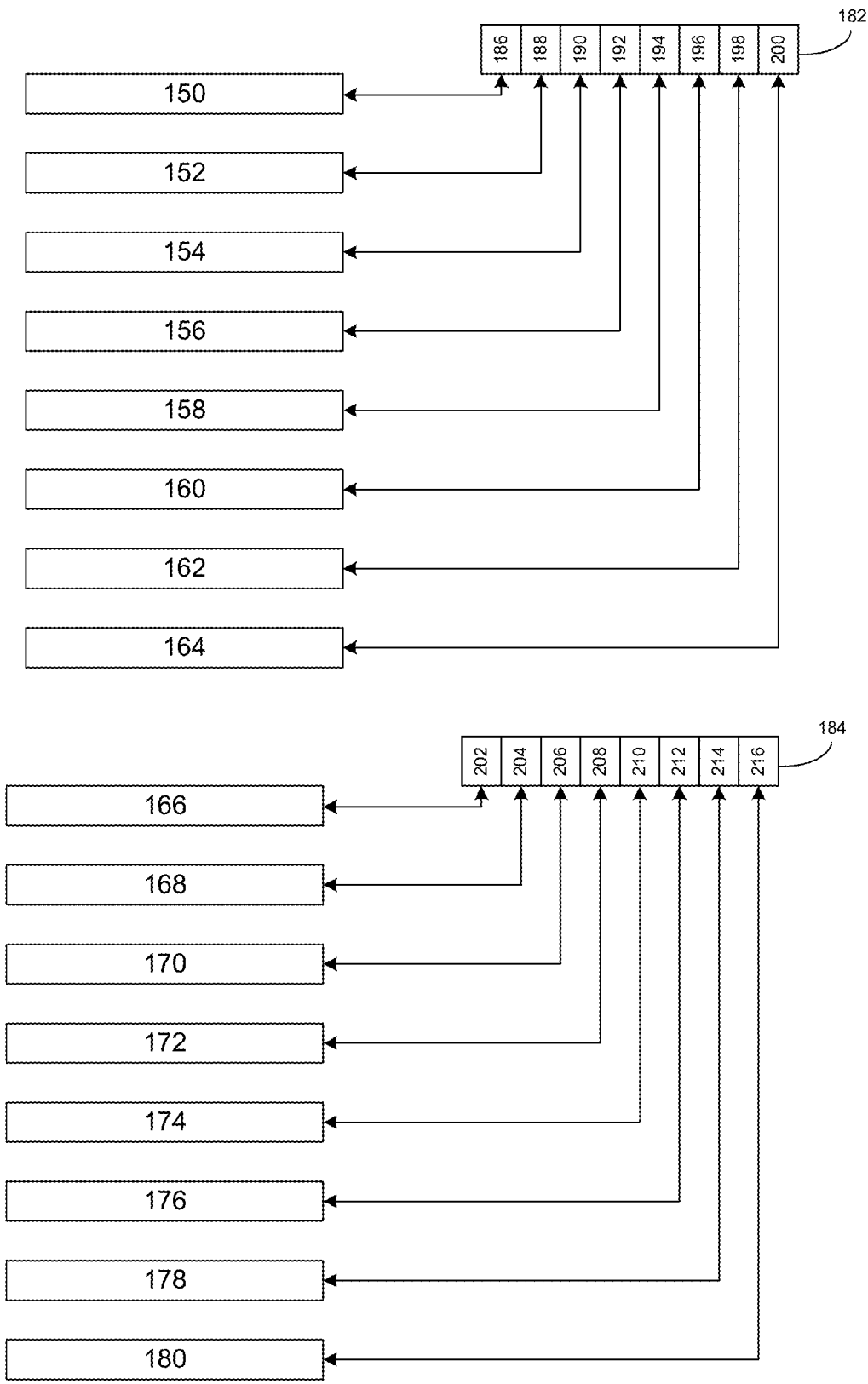
FIG. 3 is another diagrammatic view of the storage system of FIG. 1.

Referring also to FIG. 3, storage management process 10 may divide the storage available within storage system 12 into small quantities of storage (e.g., data slices (e.g., data slices 150, 152, 154, 156, 158, 160, 162, 164, 166, 168, 170, 172, 174, 176, 178, 180). Each of these data slices may have a uniform slice size (e.g., 256 megabytes). Accordingly, if storage system 12 is an 8.0 terabyte system, these 8.0 terabytes of storage space may be divided into approximately 32,000 individual 256 megabyte data slices.

As discussed above, these data slices may be thinly provisioned and assigned to users/tasks on an as needed basis. Accordingly, as e.g., user 46 writes data to storage system 12, one or more data slices may be assigned to user 46 so that the data may be written to storage system 12. Conversely, as user 46 deletes data from storage system 12, one or more data slices may be de-assigned from user 46, thus freeing up those data slices for use by other users/tasks.

One or more of the data slices defined within storage system 12 may be configured as a root slice (e.g., root slices 182, 184). Root slices 182, 184 may be configured to define the location of the data slices (e.g., data slices 150, 152, 154, 156, 158, 160, 162, 164, 166, 168, 170, 172, 174, 176, 178, 180) included within storage device 12. Each of these root slices (e.g., root slices 182, 184) may be divided into a plurality of subportions (e.g., subportions 186, 188, 190, 192, 194, 196, 198, 200 for root slice 182 and subportions 202, 204, 206, 208, 210, 212, 214, 216 for root slice 184). Each of these individual subportions may be associated with a data slice (e.g., subportion 186 of root slice 182 is assigned to data slice 150, subportion 188 of root slice 182 is assigned to data slice 152, and so on).

Within each of these subportions, location information may be defined for the root slice with which it is associated. Examples of such location information may include a device ID and a device offset. As discussed above, storage system 12 may include a plurality of individual storage devices (e.g. targets 102, 104, 106, 108, 110). Accordingly, if data slice 150 is located at the very beginning of target 102, subportion 186 of root slice 182 (the subportion associated with data slice 150) may define a device ID for target 102 and an offset of zero.

While in this particular example, each of root slices 182, 184 is shown to include eight subportions, this is for illustrative purposes only and is not intended to be a limitation of this disclosure. Specifically and in a situation in which a root slice is 256 megabytes in size, a single root slice may have about 252,000 subportions and, therefore, may define 252,000 data slice locations. Accordingly, a single root slice may provide location information for 252,000 data slices.

As discussed above, the above-described data slices may be thinly provisioned and assigned to users/tasks on an as needed basis, thus providing a higher level of efficiency with respect to storage utilization. Additionally, the above-described root slices may also be thinly provisioned and utilized on an as needed basis, thus providing further efficiency with respect to storage utilization. For example, as additional data slices are needed (due to a higher level of storage needs for one or more users/tasks), storage management process 10 may first determine if additional root slices are needed to map (i.e., locate) the additional data slices within storage system 12.

Figure 4:
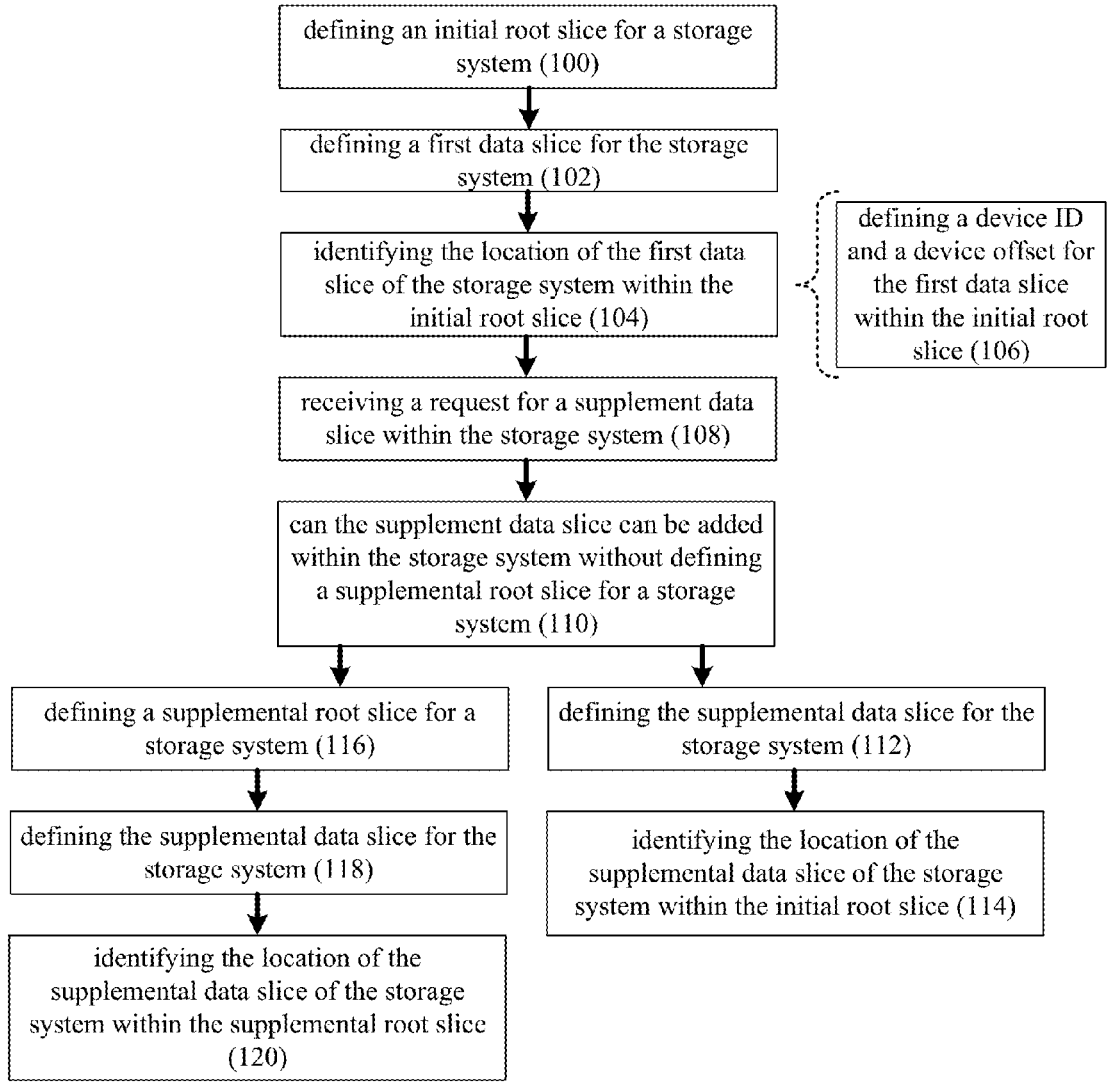
FIG. 4 is a flow chart of one implementation of the storage management process of FIG. 1.

Referring also to FIG. 4, storage management process 10 may define 100 an initial root slice (e.g., root slice 182) for storage system 12. For example, at the time that storage system 12 is configured, root slice 182 may be defined 100 so that individual data slices (e.g., data slices 150, 152, 154, 156, 158, 160, 162, 164) may be located within storage system 12.

Storage management process 10 may define 102 a first data slice (e.g., one or more of data slices 150, 152, 154, 156, 158, 160, 162, 164) for the storage system 12. For example, assume that as various users/tasks require storage space within storage system 12, individual data slices may be assigned to the related users/tasks. Specifically, assume that seven data slices (e.g., data slices 150, 152, 154, 156, 158, 160, 162) are defined 102 by storage management process 10 for various users of storage system 12.

Storage management process 10 may identify 104 the location of the first data slice (e.g., one or more of data slices 150, 152, 154, 156, 158, 160, 162, 164) of storage system 12 within the initial root slice (e.g., root slice 182). As discussed above, root slices (e.g., root slices 182, 184) may define the location of the data slices (e.g., data slices 150, 152, 154, 156, 158, 160, 162, 164, 166, 168, 170, 172, 174, 176, 178, 180) included within storage device 12. Accordingly and in this example, subportions 186, 188, 190, 192, 194, 196, 198 may provide location information for data slices 150, 152, 154, 156, 158, 160, 162 respectively.

As discussed above, when identifying 104 the location of the first data slice (e.g., one or more of data slices 150, 152, 154, 156, 158, 160, 162, 164) of storage system 12 within the initial root slice (e.g., root slice 182), storage management process 10 may define 106 a device ID and a device offset for the first data slice (e.g., one or more of data slices 150, 152, 154, 156, 158, 160, 162, 164) within initial root slice (e.g., root slice 182). As discussed above, if data slice 150 is located at the very beginning of target 102, storage management process 10 may define 106 (within subportion 186 of root slice 182; i.e., the subportion associated with data slice 150) a device ID for target 102 and an offset of zero.

Upon storage management process 10 receiving 108 a request for a supplement data slice (e.g., data slice 164) within storage system 12, storage management process 10 may determine 110 if the supplemental data slice (e.g., data slice 164) may be added within storage system 12 without defining a supplemental root slice for storage system 12.

If the supplement data slice (e.g., data slice 164) can be added within storage system 12 without defining a supplemental root slice for storage system 12, storage management process 10 may define 112 the supplemental data slice (e.g., data slice 164) for storage system 12 and may identify 114 the location of the supplemental data slice (e.g., data slice 164) of storage system 12 within initial root slice 182.

For example, assume that a user/task needs one additional data slice (e.g., data slice 164) and makes a request for the same to storage management process 10. Upon storage management process 10 receiving 108 the request for data slice 164, storage management process 10 may determine 110 that data slice 164 may be added within storage system 12 without defining a supplemental root slice for storage system 12. Specifically and in this example, each root slice is shown to be capable of locating eight data slices. As discussed above, root slice 182 is currently locating seven data slices (namely data slices 150, 152, 154, 156, 158, 160, 162) via subportions 186, 188, 190, 192, 194, 196, 198 of root slice 182. Accordingly, subportion 164 of root slice 182 is available to locate another data slice. Therefore, storage management process 10 may define 112 data slice 164 within storage system 12 and may identify 114 the location of data slice 164 of storage system 12 within subportion 200 of root slice 182.

Further assume that a user/task needs another data slice (e.g., data slice 166) and makes a request for the same to storage management process 10. Upon storage management process 10 receiving 108 the request for data slice 166, storage management process 10 may determine 110 whether data slice 166 may be added within storage system 12 without defining a supplemental root slice for storage system 12. In this example, all subportions (e.g., subportions 186, 188, 190, 192, 194, 196, 198, 200) of root slice 182 are utilized (as they are defining the location of data slices 150, 152, 154, 156, 158, 160, 162, 164), storage management process 10 may determine 110 that data slice 166 may not be added within storage system 12 without defining a supplemental root slice for storage system 12.

Since the supplement data slice (e.g., data slice 166) may not be added within storage system 12 without defining a supplemental root slice for storage system 12, storage management process 10 may define 116 a supplemental root slice (e.g., root slice 184) for storage system 12 and may define 118 the supplemental data slice (e.g., data slice 166) for storage system 12. Storage management process 10 may then identify 120 the location of the supplemental data slice (e.g., data slice 166) of storage system 12 within subportion 202 of the supplemental root slice (e.g., root slice 184).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method for a server comprising:
   defining an initial root slice for a storage system;
   defining a first data slice for the storage system;
   identifying the location of the first data slice of the storage system within the initial root slice;
   assigning an initial allocation of storage space within the storage system to a given user, as determined by an initial analysis of the given user's requirement for storage space;
   performing a real-time analysis of the given user's dynamically fluctuating requirement for storage space;
   wherein the real-time analysis determines whether the initial allocation of storage space should be modified;
   receiving a request as a result of the real-time analysis to modify the initial allocation of storage space for the given user; and
   modifying the initial allocation of storage space in real-time for the given user, by dynamically assigning or de-assigning a supplemental data slice on an as needed basis;
   wherein assigning the supplemental data slice requires a determination as to whether the supplemental data slice can be assigned within the storage system without defining an additional root slice for the storage system, wherein the additional root slice is divided into uniform subportions, and wherein the determination as to whether the supplemental data slice can be assigned within the storage system without defining the additional root slice for the storage system includes determining whether all subportions of the initial root slice are utilized, and
      if all subportions of the initial root slice are not utilized, then the supplemental data slice can be assigned within the storage system without defining the additional root slice for the storage system, and
      if all subportions of the initial root slice are utilized, then the supplemental data slice cannot be assigned within the storage system without defining the additional root slice for the storage system.

2. The computer-implemented method of claim 1 wherein identifying the location of the first data slice of the storage system within the initial root slice includes:
   defining a device ID and a device offset for the first data slice within the initial root slice.

3. The computer-implemented method of claim 1 further comprising:
   if the supplemental data slice cannot be added within the storage system without defining the additional root slice for a storage system, defining the additional root slice for a storage system.

4. The computer-implemented method of claim 3 further comprising:
   defining the supplemental data slice for the storage system.

5. The computer-implemented method of claim 4 further comprising:
   identifying the location of the supplemental data slice of the storage system within the additional root slice.

6. The computer-implemented method of claim 1 further comprising:
   if the supplemental data slice can be added within the storage system without defining the additional root slice for a storage system, defining the supplemental data slice for the storage system.

7. The computer-implemented method of claim 6 further comprising:
   identifying the location of the supplemental data slice of the storage system within the initial root slice.

8. A computer program product for a server residing on a non-transitory computer readable medium having a plurality of instructions stored thereon which, when executed by a processor, cause the processor to perform operations comprising:
   defining an initial root slice for a storage system;
   defining a first data slice for the storage system;
   identifying the location of the first data slice of the storage system within the initial root slice;

assigning an initial allocation of storage space within the storage system to a given user, as determined by an initial analysis of the given user's requirement for storage space;

performing a real-time analysis of the given user's dynamically fluctuating requirement for storage space;

wherein the real-time analysis determines whether the initial allocation of storage space should be modified;

receiving a request as a result of the real-time analysis to modify the initial allocation of storage space for the given user; and modifying the initial allocation of storage space in real-time for the given user, by dynamically assigning or de-assigning a supplemental data slice on an as needed basis;

wherein assigning the supplemental data slice requires a determination as to whether the supplemental data slice can be assigned within the storage system without defining an additional root slice for the storage system, wherein the additional root slice is divided into uniform subportions, and wherein the determination as to whether the supplemental data slice can be assigned within the storage system without defining the additional root slice for the storage system includes determining whether all subportions of the initial root slice are utilized, and if all subportions of the initial root slice are not utilized, then the supplemental data slice can be assigned within the storage system without defining the additional root slice for the storage system, and if all subportions of the initial root slice are utilized, then the supplemental data slice cannot be assigned within the storage system without defining the additional root slice for the storage system.

9. The computer program product of claim 8 wherein identifying the location of the first data slice of the storage system within the initial root slice includes:

defining a device ID and a device offset for the first data slice within the initial root slice.

10. The computer program product of claim 8 further comprising instructions for:

if the supplemental data slice cannot be added within the storage system without defining the additional root slice for a storage system, defining the additional root slice for a storage system.

11. The computer program product of claim 10 further comprising instructions for:

defining the supplemental data slice for the storage system.

12. The computer program product of claim 11 further comprising instructions for:

identifying the location of the supplemental data slice of the storage system within the additional root slice.

13. The computer program product of claim 8 further comprising instructions for:

if the supplemental data slice can be added within the storage system without defining the additional root slice for a storage system, defining the supplemental data slice for the storage system.

14. The computer program product of claim 13 further comprising instructions for:

identifying the location of the supplemental data slice of the storage system within the initial root slice.

15. A computing system for a server including a processor and memory configured to perform operations comprising:

defining an initial root slice for a storage system;

defining a first data slice for the storage system;

identifying the location of the first data slice of the storage system within the initial root slice;

assigning an initial allocation of storage space within the storage system to a given user, as determined by an initial analysis of the given user's requirement for storage space;

performing a real-time analysis of the given user's dynamically fluctuating requirement for storage space;

wherein the real-time analysis determines whether the initial allocation of storage space should be modified;

receiving a request as a result of the real-time analysis to modify the initial allocation of storage space for the given user; and modifying the initial allocation of storage space in real-time for the given user, by dynamically assigning or de-assigning a supplemental data slice on an as needed basis;

wherein assigning the supplemental data slice requires a determination as to whether the supplemental data slice can be assigned within the storage system without defining an additional root slice for the storage system, wherein the additional root slice is divided into uniform subportions, and wherein the determination as to whether the supplemental data slice can be assigned within the storage system without defining the additional root slice for the storage system includes determining whether all subportions of the initial root slice are utilized, and if all subportions of the initial root slice are not utilized, then the supplemental data slice can be assigned within the storage system without defining the additional root slice for the storage system, and if all subportions of the initial root slice are utilized, then the supplemental data slice cannot be assigned within the storage system without defining the additional root slice for the storage system.

16. The computing system of claim 15 wherein identifying the location of the first data slice of the storage system within the initial root slice includes:

defining a device ID and a device offset for the first data slice within the initial root slice.

17. The computing system of claim 15 further configured to perform operations comprising:

if the supplemental data slice cannot be added within the storage system without defining the additional root slice for a storage system, defining the additional root slice for a storage system.

18. The computing system of claim 17 further configured to perform operations comprising:

defining the supplemental data slice for the storage system.

19. The computing system of claim 18 further configured to perform operations comprising:

identifying the location of the supplemental data slice of the storage system within the additional root slice.

20. The computing system of claim 15 further configured to perform operations comprising:

if the supplemental data slice can be added within the storage system without defining the additional root slice for a storage system, defining the supplemental data slice for the storage system.

21. The computing system of claim 20 further configured to perform operations comprising:

identifying the location of the supplemental data slice of the storage system within the initial root slice.

* * * * *